United States Patent [19]

Corcoran, Jr. et al.

[11] Patent Number: 4,956,483
[45] Date of Patent: Sep. 11, 1990

[54] MOLYBDENUM PHOSPHATE COMPOSITIONS

[75] Inventors: Edward W. Corcoran, Jr., Easton, Pa.; Robert C. Haushalter, Little York; Wen-Yih F. Lai, Fairlawn, both of N.J.

[73] Assignee: Exxon Research and Engineering Company, Florham Park, N.J.

[21] Appl. No.: 350,970

[22] Filed: May 12, 1989

Related U.S. Application Data

[63] Continuation-in-part of Ser. No. 239,912, Sep. 2, 1988, abandoned.

[51] Int. Cl.$^5$ .............................................. C01G 39/02
[52] U.S. Cl. ........................................ 556/26; 556/13; 556/14; 556/20; 556/24
[58] Field of Search ....................... 556/13, 20, 26, 24, 556/14

[56] References Cited

U.S. PATENT DOCUMENTS 3,219,676 11/1965 Wilkinson ............................. 556/20

Primary Examiner—H. M. S. Sneed
Assistant Examiner—J. Saba
Attorney, Agent, or Firm—Ronald D. Hantman

[57] ABSTRACT

A class of new oxide structures containing octahedral molybdenum and tetrahedral phosphorous has been generated using hydothermal techniques. These materials are produced by the reaction of a molybdenum oxide source with phosphate and any one, or combination of organic cation/alkali-metal cation/organic amine as a templating/mineralizing agent. A reducing agent is necessary to convert the Mo(VI) to a lower valent form and can be either added to the reaction mixture or is provided in the form of one the reactants.

11 Claims, No Drawings

MOLYBDENUM PHOSPHATE COMPOSITIONS

CROSS REFERENCE TO RELATED APPLICATIONS

This application is a Continuation-in-Part of U.S. Ser. No. 239,912, filed Sept. 2, 1988, now abandoned.

BACKGROUND OF THE INVENTION

The present invention relates to new oxide structures containing octahedral molybdenum and tetrahedral phosphorous.

Structured, microporous oxides are utilized in a multitude of catalytic and sorption/separation processes in the petroleum and petrochemical industry. The most widely known group of materials that falls within this category are the aluminosilicate zeolites, see Breck, D. W., "Zeolite Molecular Sieves"; Wiley: New York, 1984. A second generation of molecular sieves, high-silica zeolites, were later introduced through the use or organic cations instead of alkali-metal bases traditionally used in zeolite synthesis gels, see Barrer, R. M., Denny, P. J., J. Chem. Soc. 1961, 971, and Kerr, G. T., Kokotailo, G., J. Am. Chem. Soc. 1961, 83, 4675. Recently, a major group of new microporous materials, the aluminophosphates, and related silicoaluminophosphates and metalloaluminophosphates, were also synthesized using organic templating species, see Wilson, S. T., Lok, B. M., Messina, C. A., Cannan, T. R., Flanigen, E. M., J. Am. Chem. Soc. 1982, 104, 1147, Lok, B. M., Messina, C. A., Patton, R. L., Gajek, R. T., Cannan, T. R.; Flanigen, E. M., U.S. Pat. No. 4,440,871, 1984, J. Am. Chem. Soc. 1984. 106, 6092, and Messina, C. A., Lok, B. M.; Flanigen, E. M., U.S. Pat. No. 4,544,143, 1985. This latter group of materials demonstrates two very important factors concerning molecular sieves: (a) that three-dimensional microporous materials can crystallize from highly acidic reaction media and (b) components other than silicon and aluminum can be used to generate porous oxide frameworks (in this case, phosphorous, and a variety of different metals).

The present invention illustrates these points through the synthesis of new compositions containing molybdenum and phosphorous as lattice constituents.

The compositions of the present invention are related to zeolites and other microporous materials because they have channels or interlayer spaces capable of reversibly sorbing molecules. Furthermore, due to the high oxidation state of the molybdenum component, it is possible to carry out selective oxidations within the pores of the materials.

SUMMARY OF THE INVENTION

The present invention is a composition of matter having the formula $[A_w(R_4X)_n(H_3O)_s]\{(Mo_2O_4)_p(O)_q[PO_{4-x}(OH)_x]_r\} \cdot mH_2O$ where A is Li, Na, K, Rb, Cs, Tl, Mg, Ca, Sr, Ba, $NH_4$ or combinations thereof; R=H or $C_aH_{2a+1}$; X is N, P, As, or combinations thereof, Mo has oxidation state $\leq +5$; $n > 0$; $s \geq 0$; $p, r > 0$; $q, w, m \geq 0$; and $o \leq x < 4$.

In a preferred embodiment the Mo has oxidation state +5 and A is an alkali or alkaline earth metal.

DESCRIPTION OF THE PREFERRED EMBODIMENT

The present invention is a new class of molybdenum and phosphorous compositions which are synthesized at low pH and in the presence of organic templating agents. These new compositions are framework oxides containing only molybdenum and phosphorous oxides as the lattice constituents. These materials resemble zeolites in that they appear to be metastable, anionic frameworks produced from cation-directed syntheses and are capable of cation exchange.

The compositions of the class of the present invention contain an alkali-metal and/or an organic cation, molybdenum, and phosphorous. The oxidation state of molybdenum is between six and four, with five being ideal. The ratio of Mo/P is generally greater than or equal to one and the structures, which are extended lattices, contain Mo—Mo bonds. There are no P—O—P linkages within the lattices and the molybdenum centers are all in an octahedral environment of oxygen.

The materials are usually prepared from the hydrothermal treatment of a molybdenum oxide source (molybdenum oxide, molybdic acid, ammonium molybdate alkali-metal molybdate, etc.) and phosphate (usually phosphoric acid) in the presence of any one, or combination of organic cation/alkali-metal cation/organic amine as a templating/mineralizing agent. A reducing agent is necessary to convert the Mo(VI) to a lower valent form (to avoid the formation of Keggin-ion type polyoxo anions which are typical of $Mo^{+6}$); it can either be added to the reaction mixture (using something such as a stoichiometric amount of molybdenum metal) or is provided in the form of one of the reactants. Reactions take place at low pH and autogenous pressures, with crystallization temperatures between 100° C. and 280° C., for periods of up to two weeks. Large amounts of highly crystalline, monophasic material usually result from this procedure. The phase that results from a synthesis is usually determined by the cation(s) and/or temperatures employed.

Alternately, these materials can sometimes be crystallized at room temperature from the aqueous filtrate when the above components are refluxed at atmospheric pressure followed by filtration. These specific structures tend to be held together by a higher amount of hydrogen bonds and contain more hydroxyl groups.

Example 1

Preparation and structural determination of $[N(C_3H_7)_4(H_3O)][(MoO)_4O_4(PO_4)_2]$ An 8.14 g quantity of 85% aqueous phosphoric acid was diluted with 19.76 g of distilled water. This was followed by the addition of 12.70 g of molybdic acid (ammonium molybdate) to the acid solution. Finally, 9.40 g of tetrapropylammonium bromide was stirred in resulting in the formation of a gel.

Reaction of this gel in a polytetrafluoroethylene-lined autoclave for 10 days at 200° C. produced a red solid when the reactor was quenched to room temperature. This solid was washed in water, filtered, and dried at 100° C. to yield a crystalline, red solid with a characteristic powder x-ray diffraction pattern (see Table 1.)

TABLE 1

| 2Theta | d | Integ. I (%) |
| --- | --- | --- |
| 7.646 | 11.5526 | 100.0 |
| 8.435 | 10.4737 | 0.1 |
| 11.272 | 7.8429 | 0.2 |
| 11.681 | 7.5694 | 4.3 |
| 11.937 | 7.4074 | 0.2 |
| 13.978 | 6.3304 | 8.4 |
| 14.964 | 5.9151 | 0.1 |

TABLE 1-continued

| 2Theta | d | Integ. I (%) |
|---|---|---|
| 15.395 | 5.7507 | 9.9 |
| 16.585 | 5.3405 | 0.3 |
| 18.297 | 4.8445 | 1.9 |
| 19.372 | 4.5780 | 0.2 |
| 22.720 | 3.9105 | 9.0 |
| 23.210 | 3.8290 | 1.2 |
| 24.827 | 3.5832 | 0.4 |
| 26.074 | 3.4145 | 4.8 |
| 27.537 | 3.2364 | 2.8 |
| 28.330 | 3.1476 | 0.6 |
| 28.683 | 3.1096 | 2.5 |
| 30.749 | 2.9052 | 1.6 |
| 31.143 | 2.8694 | 8.7 |
| 33.388 | 2.6814 | 5.0 |
| 34.538 | 2.5947 | 0.9 |
| 35.504 | 2.5263 | 3.7 |
| 36.602 | 2.4530 | 0.6 |
| 37.179 | 2.4162 | 0.6 |
| 37.724 | 2.3825 | 0.6 |
| 38.561 | 2.3327 | 1.1 |
| 39.242 | 2.2938 | 4.5 |
| 41.065 | 2.1961 | 4.7 |
| 42.904 | 2.1061 | 1.3 |
| 44.031 | 2.0548 | 0.5 |
| 44.794 | 2.0215 | 0.6 |
| 46.235 | 1.9618 | 1.4 |
| 47.544 | 1.9108 | 0.4 |
| 48.062 | 1.8915 | 0.3 |
| 48.076 | 1.8909 | 0.3 |
| 49.023 | 1.8566 | 0.7 |
| 49.844 | 1.8266 | 0.8 |

A combination of chemical and thermogravimetric analysis indicated that the formula for this material was $[N(C_3H_7)_4(H_3O)][(MoO)_4O_4(PO_4)_2]$. A red, chunk crystal having dimensions of $0.2 \times 0.1 \times 0.1$ mm was mounted and single crystal x-ray diffraction data was collected. The unit cell was found to be $a = 7.512$Å and $c = 11.384$Å with the space group P4-bar2m (#111 in the International Tables). The lattice can be defined by the following coordinates as given in Table 2:

TABLE 2

| Atom | x | y | z |
|---|---|---|---|
| Mo1 | 0.1239 | 0.1239 | 0.12480 |
| P1 | ½ | 0 | 0 |
| O1 | 0.3877 | 0.124 | 0.0774 |
| O2 | 0.128 | 0.128 | −0.0847 |
| O3 | 0.1459 | 0.1459 | 0.2696 |
| O4 | ½ | ½ | 0 |
| N1 | ½ | 0 | ½ |
| C1 | 0.534 | 0.114 | 0.397 |
| C2 | 0.694 | 0.237 | 0.423 |
| C3 | 0.730 | 0.356 | 0.316 |
| H1 | 0.432 | 0.184 | 0.381 |
| H2 | 0.561 | 0.041 | 0.331 |
| H3 | 0.667 | 0.309 | 0.489 |
| H4 | 0.796 | 0.167 | 0.439 |
| H5 | 0.756 | 0.283 | 0.250 |
| H6 | 0.627 | 0.426 | 0.299 |
| H7 | 0.828 | 0.432 | 0.332 |
| C4 | 0.657 | 0.107 | 0.470 |
| C5 | 0.606 | 0.248 | 0.378 |
| C6 | 0.771 | 0.361 | 0.347 |
| H8 | 0.747 | 0.032 | 0.439 |
| H9 | 0.700 | 0.165 | 0.539 |
| H10 | 0.563 | 0.191 | 0.309 |
| H11 | 0.516 | 0.323 | 0.409 |
| H12 | 0.814 | 0.418 | 0.415 |
| H13 | 0.861 | 0.285 | 0.316 |
| H14 | 0.739 | 0.448 | 0.290 |

EXAMPLE 2

Ion-exchange of $[N(C_3H_7)_4(H_3O)][(MoO)_4O_4(PO_4)_2]$

A 1.0 g quantity of the material synthesized in Example 1 was mixed with 5.0 g of ammonium chloride and the mixture ground using a mortar and pestle. The resulting solid was placed in a polytetrafluoroethylene-lined autoclave and reacted for 8 hours at 200° C. It was then cooled to room temperature, filtered, and repeatedly washed with distilled water. The resulting material remained highly crystalline, as inclined by the powder x-ray diffraction pattern (in Table 3). The reflection indicative of the interlayer spacing (d=11.5526Å) was shifted to a smaller spacing (d=7.7955Å) upon ammonium exchange.

TABLE 3

| 2Theta | d | Integ. I (%) |
|---|---|---|
| 7.643 | 11.5575 | 7.3 |
| 8.663 | 10.1989 | 0.1 |
| 11.341 | 7.7955 | 100.0 |
| 11.720 | 7.5443 | 1.4 |
| 13.999 | 6.3207 | 0.5 |
| 14.693 | 6.0237 | 0.4 |
| 15.378 | 5.7568 | 1.5 |
| 18.295 | 4.8451 | 0.2 |
| 19.463 | 4.5570 | 1.2 |
| 21.721 | 4.0880 | 1.2 |
| 22.093 | 4.0199 | 0.3 |
| 22.804 | 3.8963 | 47.6 |
| 23.699 | 3.7511 | 0.3 |
| 24.831 | 3.5827 | 0.2 |
| 26.084 | 3.4133 | 0.4 |
| 27.662 | 3.2220 | 3.1 |
| 28.724 | 3.1053 | 1.2 |
| 29.785 | 2.9970 | 0.8 |
| 30.172 | 2.9595 | 1.8 |
| 31.134 | 2.8702 | 1.3 |
| 31.574 | 2.8312 | 0.4 |
| 32.074 | 2.7882 | 1.4 |
| 33.428 | 2.6783 | 0.7 |
| 34.515 | 2.5964 | 0.9 |
| 34.827 | 2.5738 | 1.0 |
| 35.728 | 2.5109 | 0.2 |
| 36.642 | 2.4504 | 0.2 |
| 37.775 | 2.3794 | 0.2 |
| 38.622 | 2.3292 | 0.4 |
| 39.232 | 2.2944 | 0.4 |
| 39.671 | 2.2700 | 0.1 |
| 40.259 | 2.2382 | 0.2 |
| 41.140 | 2.1923 | 1.1 |
| 42.635 | 2.1188 | 1.3 |
| 43.188 | 2.0930 | 1.2 |
| 44.606 | 2.0296 | 1.6 |
| 45.180 | 2.0052 | 0.2 |
| 46.573 | 1.9484 | 1.3 |
| 47.074 | 1.9288 | 1.2 |
| 48.073 | 1.8911 | 0.2 |

EXAMPLE 3

Preparation of $[Na_{14}(Et_4N)_6][Mo_{24}P_{17}O_{96}(OH)_{28}] \cdot 6H_2O$

A mixture of $Na_2MoO_4$, Mo, $H_3PO_4$, tetraethylammonium hydroxide (TEA·OH), and $H_2O$ in a mole ratio of 2:1:6:2:100 was heated in a sealed, polytetrafluoroethylene lined autoclave at 175°–200° C. for 3 days to give a 95% yield of red octahedra of the compound. The product was identified by a single crystal x-ray diffraction study, simulation of the powder pattern based on the single crystal coordinates and elemental analysis. The x, y and z coordinates derived from the single crystal results as well as additional crystallographic data are given in Table 4:

TABLE 4

Crystal System: Cubic, Space Group Pn3-bar
a = 20.404 Å

| Atom | x | y | z |
|---|---|---|---|
| Mo(1) | 0.10894(7) | 0.14913(6) | −0.05383(7) |
| Mo(2) | 0.00699(7) | 0.19221(6) | 0.00853(6) |
| P(1) | 0.1111(2) | 0.1111 | 0.1111 |
| P(2) | 0.2654(2) | 0.1523(2) | −0.0121(2) |
| P(3) | ¼ | ¼ | ¼ |
| Na(1) | 0 | 0 | 0 |
| Na(2) | 0.2576(5) | 0.1100(5) | 0.1496(5) |
| O(1) | 0.0254(5) | 0.1074(5) | −0.0312(5) |
| O(2) | 0.0973(5) | 0.2238(5) | 0.0033(5) |
| O(3) | 0.1427(5) | 0.1008(5) | 0.0420(5) |
| O(4) | 0.2089(5) | 0.1751(5) | −0.0537(5) |
| O(5) | 0.1428(5) | 0.0546(5) | −0.0740(5) |
| O(6) | 0.0953(5) | 0.1767(5) | −0.1297(5) |
| O(7) | −0.0347(6) | 0.2320(5) | −0.0502(5) |
| O(8) | 0.2667(5) | 0.1867(6) | 0.0553(5) |
| O(9) | 0.1533(5) | 0.1533 | 0.1533 |
| O(10) | 0.3309(5) | 0.1708(5) | −0.0485(5) |
| O(11) | −0.0056(6) | 0.2676(5) | 0.2938 |
| O(12) | 0.2938(6) | 0.2938 | 0.2938 |
| O(13) | ¼ | ¼ | ¼ |
| O(14) | 0.393(2) | 0.393 | 0.393 |
| N(1) | 0.081(1) | ¾ | ¼ |
| C(1) | 0.120(2) | 0.763(2) | 0.191(1) |
| C(2) | 0.172(2) | 0.703(1) | 0.175(2) |
| C(3) | 0.043(1) | 0.686(1) | 0.244(2) |
| C(4) | −0.001(2) | 0.684(2) | 0.181 |

EXAMPLE 4

Preparation of [Na(PPh₄)₂(H₃O)₂][Mo₆P₄O₂₄(OH)]₇·5H₂O

A mixture of Na₂MoO₄, Mo, H₃PO₄, tetraphenylphosphonium bromide (PPh₄·Br), and H₂O in a mole ratio of 2:1:6:0.77:100 was heated in a sealed, polytetrafluoroethylene lined autoclave at 125° C. for one day to give a 50% yield of the compound. The structure was determined from a single crystal x-ray diffraction study. The x, y and z coordinates derived from the single crystal results as well as additional crystallographic data are given in Table 5:

TABLE 5

Crystal System: Triclinic, Space Group P1-bar
a = 17.314 Å   α = 110.50°
b = 18.181 Å   β = 93.29°
c = 13.232 Å   γ = 63.42°

| Atom | x | y | z |
|---|---|---|---|
| Mo(1) | 0.32750(4) | 0.43628(3) | 0.06724(4) |
| Mo(2) | 0.30238(4) | 0.58692(3) | 0.21360(4) |
| Mo(3) | 0.48499(4) | 0.62083(3) | 0.31360(4) |
| Mo(4) | 0.64073(4) | 0.49534(3) | 0.23937(4) |
| Mo(5) | 0.67674(4) | 0.28845(3) | 0.03308(4) |
| Mo(6) | 0.54451(4) | 0.26220(3) | −0.03350(4) |
| P(1) | 0.3180(1) | 0.6635(1) | 0.4780(1) |
| P(2) | 0.8002(1) | 0.3055(1) | 0.2309(1) |
| P(3) | 0.3903(1) | 0.2315(1) | 0.0582(1) |
| P(4) | 0.4960(1) | 0.4139(1) | 0.2280(1) |
| P(5) | 0.1183(1) | 0.2539(1) | 0.3293(1) |
| P(6) | 0.1476(1) | 0.1065(1) | 0.6995(1) |
| Na(1) | ½ | ½ | 0 |
| Na(2) | ½ | ½ | ½ |
| O(1) | 0.3716(3) | 0.5184(3) | 0.0710(3) |
| O(2) | 0.5448(3) | 0.5526(3) | 0.1663(3) |
| O(3) | 0.5756(3) | 0.3532(3) | −0.0291(3) |
| O(4) | 0.2695(3) | 0.6491(3) | 0.3794(3) |
| O(5) | 0.4016(3) | 0.6648(3) | 0.4513(3) |
| O(6) | 0.2614(3) | 0.7454(3) | 0.5737(3) |
| O(7) | 0.3479(3) | 0.5796(3) | 0.5124(3) |
| O(8) | 0.7314(3) | 0.3989(3) | 0.2972(3) |
| O(9) | 0.7610(3) | 0.2554(3) | 0.1463(3) |
| O(10) | 0.8438(3) | 0.2547(3) | 0.3072(3) |
| O(11) | 0.8773(3) | 0.3070(3) | 0.1769(3) |
| O(12) | 0.4786(3) | 0.2003(3) | 0.0016(3) |
| O(13) | 0.3243(3) | 0.3243(3) | 0.0688(3) |
| O(14) | 0.4000(3) | 0.2273(3) | 0.1751(3) |
| O(15) | 0.3549(3) | 0.1651(3) | −0.0004(3) |
| O(16) | 0.4359(3) | 0.5129(2) | 0.2709(3) |
| O(17) | 0.5882(3) | 0.3925(2) | 0.1945(3) |
| O(18) | 0.4605(3) | 0.3664(2) | 0.1323(3) |
| O(19) | 0.4985(3) | 0.3822(3) | 0.3257(3) |
| O(20) | 0.2383(3) | 0.4684(3) | 0.0044(3) |
| O(21) | 0.2868(3) | 0.4895(3) | 0.2222(3) |
| O(22) | 0.2077(3) | 0.6539(3) | 0.1835(3) |
| O(23) | 0.3712(3) | 0.6607(2) | 0.2374(3) |
| O(24) | 0.5006(3) | 0.7104(3) | 0.3481(3) |
| O(25) | 0.5700(3) | 0.5415(3) | 0.3765(3) |
| O(26) | 0.6993(3) | 0.5496(3) | 0.2532(3) |
| O(27) | 0.6985(3) | 0.4005(2) | 0.0817(3) |
| O(28) | 0.7527(3) | 0.2227(3) | −0.0754(3) |
| O(29) | 0.6728(3) | 0.2187(3) | 0.0616(3) |
| O(30) | 0.5855(3) | 0.1869(3) | −0.1593(3) |
| O(31) | 0.4231(3) | 0.3466(2) | −0.0663(3) |
| O(41) | 0.6277(3) | 0.2222(3) | 0.2747(3) |
| O(42) | 0.5980(4) | −0.0645(3) | 0.1969(4) |
| O(43) | 0.5649(4) | 0.0960(3) | 0.1945(5) |
| O(44) | 0.4329(5) | −0.0286(4) | 0.2358(5) |
| O(45) | 0.4066(5) | 0.0096(4) | 0.0591(6) |
| O(46) | 0.3305(3) | 0.3778(3) | 0.3330(3) |
| O(47) | 0.8826(4) | 0.3427(6) | 1.0010(5) |
| C(1) | 0.1190(4) | 0.2997(4) | 0.2298(5) |
| C(2) | 0.0822(4) | 0.2815(4) | 0.1331(5) |
| C(3) | 0.0755(5) | 0.3279(5) | 0.0661(5) |
| C(4) | 0.1049(5) | 0.3904(4) | 0.0945(6) |
| C(5) | 0.140(5) | 0.4087(4) | 0.1895(6) |
| C(6) | 0.1476(5) | 0.3634(4) | 0.2574(5) |
| C(7) | 0.2074(5) | 0.2505(4) | 0.4038(5) |
| C(8) | 0.1971(5) | 0.2993(4) | 0.5140(6) |
| C(9) | 0.2668(7) | 0.2992(6) | 0.5667(6) |
| C(10) | 0.3513(6) | 0.2476(6) | 0.5106(7) |
| C(11) | 0.3621(5) | 0.1980(5) | 0.4007(6) |
| C(12) | 0.2916(5) | 0.2008(5) | 0.3481(5) |
| C(13) | 0.1239(4) | 0.1460(4) | 0.2720(5) |
| C(14) | 0.1965(4) | 0.0706(4) | 0.2749(5) |
| C(15) | 0.1953(5) | −0.0102(4) | 0.2340(6) |
| C(16) | 0.1237(6) | −0.0169(5) | 0.1898(6) |
| C(17) | 0.0517(5) | 0.0580(5) | 0.1875(6) |
| C(18) | 0.0523(5) | 0.1389(4) | 0.2291(6) |
| C(19) | 0.0173(4) | 0.3241(4) | 0.4155(5) |
| C(20) | −0.0058(5) | 0.2958(4) | 0.4889(6) |
| C(21) | −0.0861(5) | 0.3451(5) | 0.5509(5) |
| C(22) | −0.1432(5) | 0.4229(5) | 0.5404(6) |
| C(23) | −0.1219(5) | 0.4532(5) | 0.4690(6) |
| C(24) | −0.0423(5) | 0.4039(4) | 0.4062(5) |
| C(25) | 0.1595(5) | 0.0644(4) | 0.8064(5) |
| C(26) | 0.1957(5) | 0.0937(4) | 0.8977(6) |
| C(27) | 0.2174(5) | 0.0499(5) | 0.9706(6) |
| C(28) | 0.2051(5) | −0.0235(5) | 0.9500(6) |
| C(29) | 0.1679(5) | −0.0517(5) | 0.8616(7) |
| C(30) | 0.1441(5) | −0.0075(5) | 0.7886(6) |
| C(31) | 0.2423(5) | 0.0357(4) | 0.6024(5) |
| C(32) | 0.2807(5) | −0.0536(5) | 0.5819(6) |
| C(33) | 0.3540(6) | −0.1100(5) | 0.5057(7) |
| C(34) | 0.3873(6) | −0.0765(5) | 0.4516(6) |
| C(35) | 0.3493(6) | 0.0130(5) | 0.4728(6) |
| C(36) | 0.2761(5) | 0.0691(4) | 0.5481(5) |
| C(37) | 0.1373(6) | 0.2159(5) | 0.7502(5) |
| C(38) | 0.2090(6) | 0.2299(5) | 0.7831(6) |
| C(39) | 0.2033(7) | 0.3138(6) | 0.8205(6) |
| C(40) | 0.1238(9) | 0.3837(6) | 0.8242(7) |
| C(41) | 0.0531(8) | 0.3717(5) | 0.7918(7) |
| C(42) | 0.0583(6) | 0.2881(5) | 0.7551(6) |
| C(43) | 0.522(5) | 0.1083(4) | 0.6378(6) |
| C(44) | 0.0514(6) | 0.0895(5) | 0.5266(6) |
| C(45) | −0.0261(7) | 0.1027(5) | 0.4821(7) |
| C(46) | −0.1009(6) | 0.1335(5) | 0.5459(8) |
| C(47) | −0.0997(6) | 0.1509(5) | 0.6563(7) |
| C(48) | −0.0242(6) | 0.1386(5) | 0.7017(6) |

EXAMPLE 5

Preparation of [K$_{0.5}$(Me$_4$N)(H$_3$O)$_{3.5}$][Mo$_6$P$_4$O$_{24}$(OH)$_7$]·4H$_2$O A mixture of MoO$_3$, Mo, H$_3$PO$_4$, tetramethylammonium hydroxide (TMA.OH) and H$_2$O in a mole ratio of 2:1:6:2:100 was heated in a sealed, polytetrafluoroethylene lined autoclave at 175° C. for one day. After cooling to room temperature, the vessel was opened and the mother liquor separated from the bulk product. Red single crystals of the compound could be isolated from this solution after standing for two weeks. The small amount of K present presumably arises from the tetramethylammonium hydroxide which contains small amounts of K impurities. The structure was determined from a single crystal x-ray diffraction study. The x, y and z coordinates derived from the single crystal results as well as additional crystalllographic data are given in Table 6:

TABLE 6

Crystal System: Rhombohedral, Space Group R3-bar
a = 28.28Å
c = 31.26Å

| Atom | x | y | z |
|---|---|---|---|
| Mo(1) | 0.4832(3) | 0.3589(2) | 0.5234(2) |
| Mo(2) | 0.4826(3) | 0.4048(2) | 0.5944(2) |
| Mo(3) | 0.5741(2) | 0.5471(2) | 0.6098(2) |
| Mo(4) | 0.6408(2) | 0.6030(3) | 0.5497(2) |
| Mo(5) | 0.6426(2) | 0.5405(2) | 0.4513(2) |
| Mo(6) | 0.5761(2) | 0.4369(3) | 0.4406(2) |
| K(1) | ½ | ½ | ½ |
| P(1) | 0.562(1) | 0.455(1) | 0.6809(7) |
| P(2) | 0.7583(9) | 0.628(1) | 0.5026(8) |
| P(3) | 0.5618(8) | 0.319(1) | 0.4715(7) |
| P(4) | 0.6087(7) | 0.4702(8) | 0.5461(6) |
| O(1) | 0.473(1) | 0.420(1) | 0.535(1) |
| O(2) | 0.560(2) | 0.556(2) | 0.552(1) |
| O(3) | 0.562(1) | 0.495(1) | 0.455(1) |
| O(4) | 0.516(2) | 0.411(2) | 0.652(1) |
| O(5) | 0.581(2) | 0.513(2) | 0.667(2) |
| O(6) | 0.543(2) | 0.448(2) | 0.762(1) |
| O(7) | 0.610(2) | 0.447(2) | 0.681(2) |
| O(8) | 0.725(2) | 0.631(2) | 0.540(1) |
| O(9) | 0.727(2) | 0.586(2) | 0.469(1) |
| O(10) | 0.799(2) | 0.614(2) | 0.522(2) |
| O(11) | 0.793(2) | 0.687(2) | 0.478(1) |
| O(12) | 0.584(2) | 0.372(2) | 0.441(1) |
| O(13) | 0.516(2) | 0.308(2) | 0.503(1) |
| O(14) | 0.605(2) | 0.313(2) | 0.502(2) |
| O(15) | 0.539(2) | 0.268(2) | 0.439(1) |
| O(16) | 0.572(2) | 0.467(2) | 0.585(1) |
| O(17) | 0.639(2) | 0.528(2) | 0.526(1) |
| O(19) | 0.652(2) | 0.457(2) | 0.564(1) |
| O(18) | 0.572(2) | 0.424(2) | 0.513(1) |
| O(20) | 0.420(2) | 0.311(2) | 0.521(1) |
| O(21) | 0.508(2) | 0.354(2) | 0.581(1) |
| O(22) | 0.420(2) | 0.366(2) | 0.608(1) |
| O(23) | 0.495(2) | 0.484(1) | 0.610(1) |
| O(24) | 0.566(2) | 0.597(2) | 0.630(1) |
| O(25) | 0.653(1) | 0.577(1) | 0.601(1) |
| O(26) | 0.646(2) | 0.664(2) | 0.558(1) |
| O(27) | 0.632(2) | 0.603(2) | 0.482(1) |
| O(28) | 0.648(2) | 0.562(2) | 0.399(1) |
| O(29) | 0.654(2) | 0.479(2) | 0.451(1) |
| O(30) | 0.569(1) | 0.432(1) | 0.389(1) |
| O(31) | 0.494(1) | 0.387(1) | 0.457(1) |
| O(32) | ⅔ | ⅓ | ⅓ |
| O(33) | 0.763(2) | 0.532(2) | 0.567(2) |
| O(34) | 0.707(4) | 0.545(4) | 0.654(3) |
| O(35) | 0.730(4) | 0.726(4) | 0.416(3) |
| O(36) | 0.720(4) | 0.755(4) | 0.466(3) |
| N(1) | 0.155(2) | 0.406(2) | 0.615(2) |
| C(1) | 0.147(3) | 0.399(3) | 0.568(2) |
| C(2) | 0.106(3) | 0.363(3) | 0.639(2) |
| C(3) | 0.160(2) | 0.457(2) | 0.633(2) |
| C(4) | 0.205(3) | 0.407(3) | 0.630(2) |

EXAMPLE 6

Preparation of [Pr$_4$N]$_{1.5}$[Mo$_7$P$_4$O$_{28}$(OH)$_7$]∫6H$_2$O

A mixture of MoO$_3$, Mo, H$_3$PO$_4$, tetrapropylammonium hydroxide (TPA·OH), and H$_2$O in a mole ratio of 2:1:6:2:100 was heated in a sealed, polytetrafluoroethylene lined autoclave at 175° C. for three days. After cooling to room temperature, the vessel was opened and the mother liquor separated from the bulk product. Red single crystals of the compound could be isolated from this solution after standing for one week. The structure was determined from a single crystal x-ray diffraction study. The x, y and z coordinates derived from the single crystal results as well as additional crystallographic data are given in Table 7:

TABLE 7

Crystal System: Monoclinic, Space Group C2/c
a = 30.335Å
b = 15.210Å
c = 23.150Å
β = 116.56Å

| Atom | x | y | z |
|---|---|---|---|
| Mo(1) | 0.3171(2) | 0.4189(3) | 0.6320(2) |
| Mo(2) | 0.3178(2) | 0.4687(3) | 0.5254(2) |
| Mo(3) | 0.3352(2) | 0.3127(3) | 0.4269(2) |
| Mo(4) | 0.3490(2) | 0.1489(3) | 0.4604(2) |
| Mo(5) | 0.3482(2) | 0.0823(3) | 0.6046(2) |
| Mo(6) | 0.3335(2) | 0.1974(3) | 0.6773(2) |
| Mo(7) | ¼ | ¼ | ¼ |
| P(1) | 0.3914(7) | 0.5068(9) | 0.4573(7) |
| P(2) | 0.4378(7) | 0.023(1) | 0.5669(7) |
| P(3) | 0.4020(6) | 0.3549(9) | 0.7729(6) |
| P(4) | 0.3896(6) | 0.2869(8) | 0.5905(6) |
| O(1) | 0.278(1) | 0.376(2) | 0.541(1) |
| O(2) | 0.299(1) | 0.232(2) | 0.457(1) |
| O(3) | 0.294(1) | 0.169(2) | 0.583(2) |
| O(4) | 0.373(1) | 0.524(2) | 0.507(1) |
| O(5) | 0.380(1) | 0.412(2) | 0.431(1) |
| O(6) | 0.366(1) | 0.573(2) | 0.398(10) |
| O(7) | 0.445(2) | 0.522(2) | 0.488(2) |
| O(8) | 0.410(2) | 0.075(2) | 0.501(2) |
| O(9) | 0.411(1) | 0.020(2) | 0.608(1) |
| O(10) | 0.490(2) | 0.061(3) | 0.605(2) |
| O(11) | 0.445(2) | −0.074(2) | 0.551(2) |
| O(12) | 0.379(1) | 0.262(2) | 0.760(2) |
| O(13) | 0.369(1) | 0.423(2) | 0.726(1) |
| O(14) | 0.451(1) | 0.347(2) | 0.764(1) |
| O(15) | 0.418(1) | 0.380(2) | 0.845(2) |
| O(16) | 0.365(1) | 0.349(2) | 0.530(1) |
| O(17) | 0.381(1) | 0.191(2) | 0.566(1) |
| O(18) | 0.369(1) | 0.304(2) | 0.638(1) |
| O(19) | 0.445(1) | 0.305(2) | 0.630(1) |
| O(20) | 0.274(1) | 0.491(2) | 0.631(1) |
| O(21) | 0.364(1) | 0.487(2) | 0.615(1) |
| O(22) | 0.280(1) | 0.553(2) | 0.507(1) |
| O(23) | 0.291(1) | 0.415(2) | 0.436(1) |
| O(24) | 0.305(1) | 0.299(2) | 0.347(1) |
| O(25) | 0.392(1) | 0.238(2) | 0.453(1) |
| O(26) | 0.323(1) | 0.101(2) | 0.389(1) |
| O(27) | 0.322(1) | 0.061(2) | 0.508(1) |
| O(28) | 0.323(1) | −0.006(2) | 0.620(1) |
| O(29) | 0.392(1) | 0.132(2) | 0.689(1) |
| O(30) | 0.301(1) | 0.137(2) | 0.707(1) |
| O(31) | 0.287(1) | 0.308(2) | 0.659(1) |
| O(32) | 0.520(2) | −0.139(2) | 0.540(2) |
| O(33) | 0.466(2) | 0.324(3) | 0.439(2) |
| O(34) | 0.005(2) | 0.014(2) | 0.607(2) |
| O(35) | 0.522(2) | 0.155(3) | 0.714(2) |
| O(36) | 0.003(2) | 0.205(3) | 0.078(2) |
| O(37) | 0.961(2) | −0.000(3) | 0.690(3) |
| N(1) | 0.7269(9) | 0.226(1) | 0.640(1) |
| N(2) | ¼ | 0.174(4) | ¼ |
| C(1) | 0.7634(5) | 0.173(2) | 0.693(1) |
| C(2) | 0.8149(3) | 0.188(2) | 0.697(2) |
| C(3) | 0.8531(8) | 0.132(3) | 0.752(2) |

EXAMPLE 7

Preparation of $(Me_4N)_{2-x}(H_3O)_x[Mo_4O_8(PO_4)_2] \cdot y\ H_2O$

The reaction of $MoO_3$, Mo, $H_3PO_4$, $H_2O$ and tetramethylammonium hydroxide ($Me_4N \cdot OH$) in a mole ratio of 5:1:18:165:7 at 200° C. for three days gives very good yields of single phase $(Me_4N)_x(H_3O)_{2-x}[Mo_4O_8(PO_4)_2] \cdot y\ H_2O$. The single crystal x-ray data, thermal gravimetric analysis and elemental analysis suggests that both x and y are close to 1. Single crystals could be obtained by using $MoCl_4$ in place of $MoO_3$/Mo.

After degassing under vacuum for 10 hours at 125° C., this material reversibly absorbs about 4% water.

Structure Determination: The structure was identified by a single crystal x-ray structure determination which showed the crystals to be cubic, space group I-4bar3m, with a=15.05Å.

The anionic molybdenum phosphate framework in this material can be described with the following coordinates in space group I-4bar3m:

| Atom | X | Y | Z |
|------|--------|--------|--------|
| Mo1  | 0.9386 | 0.9386 | 0.4060 |
| P1   | 0.7500 | 0.0000 | 0.5000 |
| O1   | 0.9359 | 0.9359 | 0.5642 |
| O2   | 0.9283 | 0.9283 | 0.296  |
| O3   | 0.8062 | 0.9409 | 0.4378 |

EXAMPLE 8

Preparation of $(Me_2NH_2)_2[Mo_4O_8(PO_4)_2]$

The reaction of $MoCl_4$, $H_3PO_4$, $H_2O$ and $Me_2NH_2 \cdot OH$ in a mole ratio of 1:4.26:40:9.5 at 125° C. for two days or more gives analytically pure $(Me_2NH_2)_2[Mo_4O_8(PO_4)_2]$ as a reddish powder. This compound is primitive tetragonal with a=7.51 and c=17.55Å.

What is claimed is:

1. A composition of matter having the formula $[A_w(R_4X)_n(H_3O)_s]\{(Mo_2O_4)_p(O)_q[PO_{4-x}]_r\}\ mH_2O$ where A is Li, Na, K, Rb, Cs, Tl, Mg, Ca, Sr, Ba, $NH_4$ or combinations thereof $R=$, $C_6H_5$, or $C_aH_{2a+1}$; X is N, P, As, or combinations thereof; Mo has oxidation state $\leq +5$; $n > o$; $s \geq o$; p, $r > o$; q, w, $m \geq o$; and $o \leq x < 4$.

2. The composition of claim 1 wherein w=o.

3. The composition of claim 1 wherein Mo has oxidation state +5.

4. The composition of claim 1 having the formula $[N(C_3H_7)_4(H_3O)][(MoO)_4O_4(PO_4)_2]$.

5. The composition of claim 1 where A is selected from the group consisting of Li, Na, K, Rb, Cs, Mg, Ca, Sr, and Ba.

6. The composition of claim 1 having the formula $[Na_{14}(Et_4N)_6][Mo_{24}P_{17}O_{96}(OH)_{28}] \cdot 6H_2O$.

7. The composition of claim 1 having the formula $[Na(PPh_4)_2(H_3O)_2][Mo_6P_4O_{24}(OH)_7] \cdot 5H_2O$.

8. The composition of claim 1 having the formula $[K_{0.5}(Me_4N)(H_3O)_{3.5}][Mo_6P_4O_{24}(OH)_7] \cdot 4H_2O$.

9. The composition of claim 1 having the formula $[Pr_4N]_{1.5}[Mo_7P_4O_{28}(OH)_7] \cdot 6H_2O$.

10. The composition of claim 1 having the formula $(Me_4N)_{2-a}(H_3O)_x[Mo_4O_8(PO_4)_2] \cdot b\ H_2O$ where a and b are close to 1.

11. The composition of claim 1 having the formula $(Me_2NH_2)_2[Mo_4O_8(PO_4)_2]$.

* * * * *